UNITED STATES PATENT OFFICE.

EDWARD WERNIGK, OF MONEE, ILLINOIS.

IMPROVEMENT IN PROCESSES OF MANUFACTURING WHISKY.

Specification forming part of Letters Patent No. 165,392, dated July 6, 1875; application filed April 8, 1875.

*To all whom it may concern:*

Be it known that I, EDWARD WERNIGK, of Monee, in the county of Will and State of Illinois, have invented certain Improvements in Process for the Manufacture of Whisky, of which the following is a specification:

My invention consists in an improved process of making whisky, whereby a purer and better article is produced than by the usual modes or processes; and it consists more especially in the use or addition to the ordinary materials of tannin in any of its various forms, with or without the addition of muriatic acid and bitartrate of potassa, as hereinafter more fully described.

The process is as follows: To one hundred pounds of corn-meal add sixty-five gallons of water, and heat to a temperature of 180° Fahrenheit, reducing the temperature after awhile to 160°. I then add five ounces of muriatic acid, (commercial,) four ounces of Aleppo nut-galls of best quality, reduced to a powder, and twelve and a half ounces of malt. The mass is to be kept at from 158° to 160° for one hour, when I add five ounces more of the muriatic acid, after which the formation of grape-sugar is allowed to go on for one hour more, the mass being kept at the same temperature. It is then cooled down to a temperature suitable for fermentation, when I add one ounce of bitartrate of potassa and the necessary amount of yeast, after which the mass is left to ferment. The first run of high-wine produced by this mode has the flavor and taste of a fine fruit brandy. The next gives, by redistillation in the ordinary apparatus, an article resembling, in flavor or taste, a rye or malt whisky. By using a more complicated apparatus the redistillation may not be required. By adding a larger percentage of tannin and bitartrate of potassa the spirit produced may be still more improved. The effect of the addition of the substances named is, that while fermenting there is produced less of fusel-oils or amylic alcohol; and the fusel-oil, distilling between 140° and 160°, is, practically, wholly avoided; chiefly in consequence of the absence of the fusel-oil, even with a less complicated distilling apparatus, a superior article is produced, and the flavor of the resulting liquor is greatly improved.

While the proportions given above are believed to be the best for practical use, still they may be varied more or less without departing from the principle of my invention or process. I would also remark that, instead of using nut-galls, other substances containing tannin may be substituted as the chemical equivalent thereof, many such substances being well known to chemists.

While I prefer to use the three ingredients, as above stated, for producing the very best results, I would state that the tannin is by far the more important ingredient, and that the quality and flavor of the liquor produced may be greatly improved by the use of tannin without the other ingredients, and that, hence, I do not limit myself to the use of all three together.

Having thus described my process or invention, what I claim is—

1. As an improvement in the manufacture of distilled spirits, the process of lessening the production of fusel-oils, and improving the flavor of the liquor by the employment of tannin in the preparation of the mash, substantially as described.

2. The process of improving the flavor and quality of liquor distilled from grain by the employment of tannin, muriatic acid, and bitartrate of potassa, in the preparation of the mash therefor, substantially in the proportions and manner set forth.

EDWARD WERNIGK.

Witnesses:
AUGUST SCHIFFER,
W. F. HUTCHINSON.